United States Patent Office 3,510,307
Patented May 5, 1970

3,510,307

PROCESS FOR THE PREPARATION OF A PRINTING PLATE PRESENSITIZED WITH A DIAZONIUM SALT

Henning H. Borchers, Mountainside, N.J., and Hartmut Steppan, Wiesbaden-Dotzheim, and Fritz Uhlig, Wiesbaden-Biebrich, Germany, assignors to Kalle Aktiengesellschaft, Wiesbaden-Biebrich, Germany, a corporation of Germany No Drawing. Filed Dec. 30, 1965, Ser. No. 517,835
Claims priority, application Germany, Jan. 2, 1965, K 54,925
Int. Cl. G03c *1/54*
U.S. Cl. 96—75 6 Claims

ABSTRACT OF THE DISCLOSURE

This invention relates to a light-sensitive coating solution, and to a method of making a presensitized printing plate using the coating solution, the solution comprising at least one light-sensitive diazonium salt, at least one organic polyvalent acid compound selected from the group consisting of organic polyvalent acids and salts thereof, and at least one mineral acid selected from the group consisting of hydrochloric and hydrobromic acids, the light-sensitive diazonium salt and organic polyvalent acid compound being present in the solution in such amounts that a diazonium salt of the organic polyvalent acid would separate from the solution in the absence of the mineral acid.

German Patent No. 1,134,093 discloses a presensitized planographic printing plate with good adhesion between the reproduction coating support and the reproduction coating, in which aluminum having a thin coating of one or of several phosphonic acids or derivatives thereof is used as a support for the reproduction coating. In an application of addition to this patent, i.e., DAS (German printed application) No. 1,160,733, the reproduction coating adhering to the layer of phosphonic acid or derivative thereof contains as a light-sensitive substance a condensation product of a salt of a diphenylamine-4-diazonium compound with formaldehyde; the condensation product is free from metal salts and is condensed in an acid medium.

In U.S. Patent No. 3,179,518, the use of polyvinyl phosphonic acid for the preparation of presensitized printing plates is described. A light-sensitive solution is applied to a supporting foil which contains, in addition to a diazo compound, small amounts of polyvinyl phosphonic acid. The process described in this U.S. patent has the advantage that the printing foil serving as a reproduction coating support need be coated with only one solution. However, this known process, because of the only limited compatibility of diazonium compounds and polyvinyl phosphonic acid with each other in the solution, renders possible only the application of solutions whose content of polyvinyl phosphonic acid is moderate. Consequently, this process leads in many cases to only a moderate improvement in the serviceability of the printing plate containing polyvinyl phosphonic acid in the coating solution. Further, the coating solution used in the known process is very sensitive to comparatively slight changes in the environment. For example, in the case of a lowering of the temperature or a subsequent correction of the coating solution by increasing one or other of its dissolved constituents, turbidity or precipitation in the solution can easily result. Turbidity or precipitation in the solution, however, often results in inferior printing foils so, where turbidity or precipitation occurs, clarification of the solution, generally by filtration, is performed.

It has now been found that, in order to avoid the aforementioned disadvantages in the preparation of a presensitized printing plate, which preparation is effected by application of a solution, which contains cations of at least one light-sensitive diazonium salt and anions of at least one organic polyacid, to an aluminum coating support and drying the applied coating, it is very advantageous to apply a solution in which the cations of the diazonium salt and the anions of the organic poly-acid are dissolved together with such an amount of hydrochloric acid and/or hydrobromic acid that the solution is free from precipitated salt composed of said cations and anions.

In the process, the cations of the diazonium salt, in the form of a salt, and the anions of the polyvalent organic acid, in the form of another salt or in the form of the free polyvalent organic acid, may be dissolved in the solvent intended for the coating solution. In another embodiment of the process, the two ions in the form of one and the same salt, i.e. as a diazonium salt of the polyvalent organic acid, are dissolved in the solvent. In every case, however, a hydrochloric acid solution or a hydrobromic acid solution is used for the coating of the support. Solutions of hydrochloric acid are preferred to solutions of hydrobromic acid, because the coatings prepared with hydrochloric acid solutions dry more easily. Surprisingly, fairly strongly acid solutions are suitable for the coating of aluminum supports, and use thereof lead to reproduction material which, with respect to resistance to acids and the length of printing runs obtainable, is in general equivalent to, and in many cases even superior to, the reproduction material described in U.S. Patent No. 3,179,518, supra.

As in the process described in the U.S. patent, supra, many different kinds of diazo compounds can be used, namely the diazonium salts which can be used otherwise in diazotype processes, i.e. including those salts which when exposed to light by themselves yield products which adhere only inadequately to aluminum supports.

The best results are obtained with solutions which contain the anion of a polyvinyl phosphonic acid. Thus, relatively small additions of polyvinylphosphonic acid to the coating solutions of the diazonium salts are effective, for example, amounts of 5 to 10 mole percent, based upon the diazonium salt. However, considerably more polyvinyl phosphonic acid also may be used, e.g. 100 to 300 mole percent. Too high a content of polyvinylphosphonic acid in the coating solution may, however, because of the hydrophilizing properties of polyvinylphosphonic acid, result in the ink acceptance of the plate prepared therewith being undesirably reduced. It is therefore advisable that the polyvinyl phosphonic acid content be not more than 300 mole percent, preferably 5–150 mole percent.

As noted above, when preparing the coating solution the diazonium salt may be dissolved as a salt of the polyvalent organic acid in whatever solvent is used. For example, the precipitation products which can be prepared from any of the salts of diphenylamine-4-diazonium or from any of the salts of the substitution products of diphenylamine-4-diazonium, or from the condensation products of all these salts with formaldehyde, by reaction with equivalent amounts of polyvinylphosphonic acid or other polyvalent organic polyacid, which precipitation products are diazonium salts of the respective polyvalent organic acid, can be dissolved in dilute hydrochloric acid or hydrobromic acid and used in such solutions for the sensitizing of aluminum supports. As organic polyvalent acids, there may be used, in addition to polyvinylphosphonic acid, those organic polyvalent acids whose acid groups are carboxylic acid groups or sulfonic acid groups, for example, preferably those which have carboxylic acid groups or sulfonic acid groups in addition to phosphonic acid groups.

In order to prepare these precipitated salts, a dilute aqueous or aqueous-organic solvent solution of any salt of diphenylamine-4-diazonium or of its substituted derivatives or of a condensation product of one of such salts with formaldehyde and a solution of an organic polyacid are mixed together and, if desired, a weakly acid pH-value (approximately 5–6) is produced in order to make the precipitation as complete as possible.

To one mole of diazonium compound there is used for precipitation one to 5 moles, preferably 3 moles, of the polyacid. The precipitation products which form, separate immediately and can be isolated in known manner. Yellow-greenish to yellow-orange colored, light-sensitive substances are obtained which, in the presence of hydrochloric acid or hydrobromic acid, are soluble in water and/or organic solvents.

As diphenylamine-4-diazonium salts for the preparation of the precipitation products, there may be used, for example, diphenylamine-4-diazonium chloride, diphenylamine - 4 - diazonium bromide, diphenylamine - 4 - diazonium sulfate, diphenylamine - 4 - diazonium phosphate, 4′ - methyl - 3 - methoxy - diphenylamine - 4 - diazonium chloride, 4′ - methoxy - diphenylamine - 4 - diazonium chloride, 4′ - methoxy - diphenylamine - 4 - diazonium sulfate, 4′ - methyl - diphenylamine - 4 - diazonium chloride, 3 - hydroxyethoxy - diphenylamine - 4- diazonium chloride, 3 - methoxy - diphenylamine - 4 - diazonium chloride, 3 - ethoxy - diphenylamine - 4 - diazonium chloride, and others.

As condensation products of these diphenylamine-4-diazonium salts, those are used which are prepared in a conventional manner in an acid medium, preferably sulfuric acid, hydrochloric acid, hydrobromic acid or phosphoric acids, with formaldehyde. There is used, for example, the product which is prepared by the condensation of formaldehyde with diphenylamine-4-diazonium sulfate in concentrated sulfuric acid and precipitated with zinc chloride, or the condensate described in Example 3 of German Patent No. 1,142,871, which is obtained by condensation of diphenylamine-4-diazonium bromide and paraformaldehyde in hydrobromic acid, or the condensate described in Example 5 of German Patent No. 1,138,399, which is obtained by condensation of 3-methoxy-diphenylamine-4-diazonium chloride and paraformaldehyde in phosphoric acid, or the condensate described in Example 4 of U.S. Patent No. 3,163,633, which is obtained by condensation of 4′-methyldiphenylamine-4-diazonium sulfate and paraformaldehyde in sulfuric acid. As organic acids whose acid groups are phosphonic acid groups and/or carboxylic acid groups, there are used, for example, polyvinylphosphonic acids or the formaldehyde condensate of phenoxy-methyl-phosphonic acid or polyacrylic acid or mellitic acid or polyvinyl hydrogen phthalate or copolymers from acrylic acid and vinyl phosphonic acid or from acrylamide and vinyl phosphonic acid or polyvinylsulfonic acid.

The amount of hydrochloric acid used for the preparation of the coating solutions may be up to 25% by volume, based upon the total volume of the coating solution. However, since this addition of acid merely ensures the homogeneity of the coating solution and must be evaporated after coating, the acid content desirably is kept as low as possible. The quantity of hydrochloric acid or hydrobromic acid to be used depends on the size of the molecule of the diazonium compound, on the proportion of diazonium compound to polyacid, on the nature of the polyacid, and on the solvent. The least amount required to effect the solubility of the diazonium salt can, however, be easily determined in each case by routine experiment. The examples hereinafter indicate amounts of acid to be used in individual cases.

In order to prepare the planographic printing plates according to the invention, aluminum supports are coated according to known methods with the homogeneous coating solutions which contain hydrochloric acid or hydrobromic acid, e.g. by immersion, by application by means of rollers, by pouring on and by whirl-coating, or according to the so-called "do-it-yourself" or wipe-on method of application by hand, using a pad of cotton. Advantageously, concentrations of 0.1% to 10% by weight of solids are used. The reproduction material obtained can be stored for at least several days, but often weeks or months in the dark at room temperature.

In order to increase the hydrophilic properties, to increase ease of use or to increase the length of printing run of the plate, suitable substances, such as plasticizers, dyes, fatty acids, colloids or resins may be added to the light-sensitive solutions. For example, the following resins may be used: phenol-formaldehyde resins, maleinate resins, epoxy resins, polyacrylic acid resin, polyvinylacetals, polyvinylchloride, copolymers from vinylacetate and vinyl chloride; from vinylchloride, vinylacetate and maleic acid or from styrene and maleic acid anhydride; as colloids, cellulose ethers and alginates may be used, for example. However, such additives are generally not necessary.

The process according to the invention has the advantage that the light-sensitive coating solution can be applied to the aluminum support without chemical pretreatment of the latter and, despite this, printing plates of good quality, particularly with regard to the length of printing run obtainable with them, are obtained.

The presensitized planographic printing plates prepared according to the invention, compared with the planographic printing plates prepared according to the process of the aforementioned U.S. Patent No. 3,179,518, also have the advantage that they have a more uniform coating, are more easily susceptible to being prepared in uniform quality and frequently yield a longer printing run than the known planographic printing plates.

In the following examples, parts by weight bear the same relation to parts by volume as grams to ml.

EXAMPLE 1

A condensation product prepared according to Example 1 of Belgian Patent No. 608,789, by condensing diphenylamine-4-diazonium chloride and formaldehyde in 85% phosphoric acid, is precipitated out of an approximately 1 to 30% solution of the condensation product in water, using an approximately 10% by weight solution of polyvinyl phosphonic acid (3 equivalents of polyvinylphosphonic acid to 1 equivalent of diazonium groups being used).

After the precipitation product has been isolated by filtration and purified by washing, 1 part by weight is dissolved in 50 parts by volume of 5% aqueous hydrochloric acid, and the solution is filtered. With this solution, a mechanically roughened aluminum plate is coated by hand, using a pad of cotton. The plate is then dried for about two minutes at a temperature of 80° to 120° C. The presensitized plate can be stored in the dark for several months.

In order to prepare a printing plate, the coated side of the plate is exposed under a negative original and then wiped over with a sponge, a pad of cotton or a plush pad which has been immersed in water. In this way, the coating in the areas not affected by light is removed, while in the areas affected by light the light-decomposition product is not dissolved by the water and remains adherent to the plate. In order to reinforce the light-decomposition image, lacquering is effected by wiping over with an emulsion lacquer which, in accordance with DAS (German printed application) No. 1,143,710, contains in the aqueous phase thereof an organic, water-soluble colloid such as gum arabic and in the non-aqueous phase thereof a phenolic resin of the novolak type dissolved in an organic solvent. Alternatively, inking up with greasy ink may be effected in conventional manner.

without such reinforcement. With the printing plate thus obtained, many thousands of prints can be produced in an offset machine.

EXAMPLE 2

A condensation product (crude condensate) prepared according to Example 1 of German Patent No. 1,138,401, by condensation of 3-methoxy-diphenylamine-4-diazonium chloride and formaldehyde in 85% phosphoric acid, is precipitated out of a 4% solution of the condensation product in water using a 3% solution of a copolymer (in which 6 group equivalents of acrylic acid are copolymerized with 4 group equivalents of vinylphosphonic acid) in water. Three equivalents of free acid of the copolymer to 1 equivalent of diazonium groups are used. 0.5 part by weight of the isolated precipitation product is dissolved in 100 parts by volume of glycolmonomethylether with the addition of 0.8 part by volume of 2 N aqueous hydrochloric acid. An aluminum support roughened by brushing is coated with this solution on a whirl-coater, and carefully dried. The presensitized plate has good shelf life.

In order to prepare a printing plate, the plate is exposed under a negative original. Development is effected by wiping over with an aqueous solution of phosphoric acid, e.g. solutions which contain 10% of phosphoric acid are suitable. The printing plate then can be inked up directly and used for printing. Many thousands of prints can be made therefrom.

EXAMPLE 3

The same procedure is followed as in Example 2, but the condensation product of 3-methoxy-diphenylamine-4-diazonium chloride and formaldehyde is precipitated by means of an aqueous solution of a copolymer of 9 equivalents of vinyl phosphonic acid and 1 equivalent of acrylamide. 0.5 part by weight of the precipitation product is dissolved in 100 parts by volume of ethyleneglycolmonomethylether with the addition of 3.2 parts by volume of 36.5% by weight hydrochloric acid.

A printing plate is obtained from which a large number of flawless prints can be made.

EXAMPLE 4

The condensation product from diazonium salt and formaldehyde described in Example 2 is precipitated from a solution of the condensation product with an aqueous solution of a formaldehyde condensate of phenoxymethyl phosphonic acid. 0.5 part by weight of the precipitation product is dissolved in 100 parts by volume of ethyleneglycolmonomethylether with the addition of 0.4 part by volume of 37% aqueous hydrochloric acid. With this solution, an aluminum support, roughened by brushing, is coated on a whirl-coater. After evaporation of the solvent from the coating, the coated plate is further dried for two minutes at 100° C.

By exposure under a negative original followed by development with a 5% aqueous solution of sodium diphosphate, a printing plate is obtained from which a larger number of flawless prints can be made.

The formaldehyde condensate necessary for the preparation of the precipitation product is prepared as follows:

3.8 parts by weight of phenoxymethylphosphonic acid are dissolved in 6 parts by volume of water, 2.5 parts by weight of 30% aqueous formaldehyde solution are added and the solution is boiled under reflux for 20 minutes. The reflux condenser is then removed and heating is effected in an open vessel for one hour in an oil-bath at 110° C. During this time, the water contained in the condensation mixture is evaporated and there remains a viscous mass which, when cooled, solidifies in vitreous form and forms a clear solution in water.

In order to prepare the precipitation product, equivalent aqueous solutions of the diazo condensation product and of the phosphonic acid condensation product are mixed; the precipitate which forms is filtered off and dried. In the precipitation product there are, according to analysis, two phosphonic acid groups to each diazo group.

It is, therefore, preferable to use for the precipitation 2 equivalents of the phosphonic acid condensation product to 1 equivalent of the diazo condensation product.

EXAMPLE 5

0.5 part by weight of a precipitation product which, in the manner described below, is obtained from the condensation product described in Example 2 by precipitation with polyacrylic acid, is dissolved in 100 parts by volume of ethyleneglycolmonomethylether with the addition of 0.5 part by volume of 37% aqueous hydrochloric acid. An aluminum foil which has been roughened by brushing is coated with this solution and, after drying the coating, the foil is further dried for two minutes at 100° C.

The light-sensitive plate is exposed under a transparent original. For development a solution is used which is prepared by mixing 20 parts by volume of an 11.5% aqueous solution of gum arabic, 100 parts by volume of 1% phosphoric acid, and 80 parts by volume of water. The plate, moist with developer, is then inked up with protective ink and used for printing.

To prepare the precipitation product, 18.2 parts by weight of the crude condensate prepared according to the procedure of Example 1 of German Patent No. 1,138,401, are dissolved in 1500 parts by volume of water. A solution of 11 parts by weight of polyacrylic acid (K155/2 low viscosity) in 2100 parts by volume of water is added, and a saturated aqueous solution of of sodium acetate is then added for so long as such addition causes precipitation. An excess must be avoided, since the precipitation product is soluble in excess aqueous sodium acetate solution. The somewhat sticky precipitate is separated, washed with a little water, and dried. According to analysis, there are about six carboxylic acid groups to each diazonium group.

EXAMPLE 6

1.0 part by weight of the precipitation product from 3 moles of polyvinylphosphonic acid and one mole of 3-methoxy-diphenylamine-diazonium chloride is dissolved in a solution consisting of 70 parts by volume of methylglycol, 20 parts by volume of water and 10 parts by volume of concentrated hydrochloric acid. The solution is filtered and a roughened aluminum plate is coated therewith.

To prepare a printing plate, the plate is exposed under a negative original, wiped over with water and, in order to strengthen the printing plate obtained, lacquered with a lacquer which consists of a solution of a non-hardening phenol-formaldehyde resin and which contains, in addition, to a solvent, a polyhydric aliphatic alcohol.

EXAMPLE 7

1.0 part by weight of the precipitation product from 1 mole of polyvinylphosphonic acid and the zinc chloride double salt of the condensation product obtained from 1 mole of diazodiphenylamine sulfate and 1 mole of formaldehyde by condensation in sulfuric acid of 60° Bé, is dissolved in a solvent consisting of 60 parts by volume of methylglycol, 20 parts by volume of water and 20 parts by volume of concentrated hydrochloric acid.

To prepare a printing plate, the procedure of Example 6 is followed.

EXAMPLE 8

0.5 part by weight of the precipitation product from 1 mole of mellitic acid and 1 mole of the diazo condensate described in Example 1 are dissolved in a solution consisting of 20 parts by volume of water, 60 parts by volume of methylglycol and 20 parts by volume of concentrated hydrochloric acid. The solution is filtered and a roughened aluminum plate is coated therewith. To prepare a printing plate, after exposure under a negative original the plate is wiped over with water and inked up with greasy ink.

EXAMPLE 9

A solution is prepared from 0.1 part by weight of polyvinylphosphonic acid, 4 parts by volume of water, 96 parts by volume of glycolmonomethylether, 4 parts by volume of 36.5% aqueous hydrochloric acid and 1.3 parts by weight of the zinc chloride double salt of the diazo compound of 4-amino-2,5-diethoxy-4′ - methyldiphenylsulfide. With the clear solution obtained, an aluminum support which has been roughened by brushing is coated, e.g. on a whirl-coater.

After exposure under a negative original, development is performed with water and inking up is effected with greasy ink. A positive printing plate is obtained which can be used to prepare a large number of prints.

The length of printing run can be substantially increased by aftertreatment of the developed plate with one of the conventional emulsion lacquers, e.g. the lacquers described in German Patent No. 1,143,710.

EXAMPLE 10

A solution is prepared from 1.08 parts by weight of 3-methoxydiphenylamine - 4 - diazonium chloride (92.5% concentration in water), 92 parts by volume of ethyleneglycolmonomethylether, 0.2 part by weight of polyvinylphosphonic acid, 8 parts by volume of water, and 2 parts by volume of 36.5% aqueous hydrochloric acid. A clear solution is obtained with which an aluminum support roughened with brushes is coated.

Processing into a printing plate is performed in the manner described in Example 9.

EXAMPLE 11

0.25 part by weight of the precipitation product from 3 moles of polyvinylsulfonic acid and 1 mole of the diazonium salt condensate described in Example 1 are dissolved in a solution consisting of 30 parts by volume of water, 60 parts by volume of methylglycol and 10 parts by volume of concentrated hydrochloric acid. The solution is filtered and an aluminum plate is coated therewith.

To prepare a printing plate, the procedure described in Example 1 is followed.

EXAMPLE 12

A brushed aluminum foil is coated with a solution obtained from 0.5 part by weight of a precipitation product described below, 2 parts by volume of 63% aqueous hydrobromic acid, 3 parts by volume of water and 50 parts by volume of ethyleneglycolmonomethylether, and is dried in the air.

The precipitation product is prepared by precipitating 1 mole of the product obtained by condensing 5 parts by weight of 3-methoxydiphenylamine-4-diazonium chloride with 0.63 part by weight of paraformaldehyde in 4.8 parts by volume of 85% phosphoric acid, out of its aqueous solution with 3 moles of polyvinylphosphonic acid. The thus coated aluminum foil is further dried for 2 minutes at 100° C.

It will be obvious to those skilled in the art that many modifications may be made within the scope of the present invention without departing from the spirit thereof, and the invention includes all such modifications.

What is claimed is:

1. A presensitized printing plate having an aluminum base coated with a dry coating of a coating solution comprising (1) a light-sensitive compound selected from the group consisting of a diphenylamine-4-diazonium salt of a polyvinyl phosphonic acid, a diphenylsulfide-4-diazonium salt of a polyvinyl phosphonic acid, and condensation products with formaldehyde of a diphenyl-4-diazonium salt or a diphenylsulfide-4-diazonium salt reacted with a polyvinyl phosphonic acid, and (2) at least one mineral acid selected from the group consisting of hydrochloric and hydrobromic acids, the light-sensitive compound being present in the solution in such amounts that it would separate out in the absence of the mineral acid.

2. A presensitized printing plate according to claim 1 in which the cationic component of the light-sensitive diazonium salt is the diazonium base group of a condensation product of diphenylamine-4-diazonium chloride and formaldehyde condensed in phosphoric acid.

3. A presensitized printing plate according to claim 1 in which the cationic component of the light-sensitive diazonium salt is the diazonium base group of a condensation product of 3-methoxy-diphenylamine-4-diazonium chloride and formaldehyde condensed in phosphoric acid.

4. A presensitized printing plate according to claim 1 in which the cationic component of the light-sensitive diazonium salt is the diazonium base group of a condensation product of 3-methoxy-diphenylamine-4-diazonium chloride and formaldehyde condensed in phosphoric acid.

5. A presensitized printing plate according to claim 1 in which the cationic component of the light-sensitive diazonium salt is the diazonium base group of the condensation product of diazodiphenylamine sulfate and formaldehyde condensed in sulfuric acid.

6. A presensitized printing plate according to claim 1 in which per 100 diazonium base groups of the light-sensitive diazonium salt, from 5 to 300 phosphonic groups of polyvinyl phosphonic acid are present.

References Cited

UNITED STATES PATENTS

| | | | |
|---|---|---|---|
| 3,179,518 | 4/1965 | Sus et al. | 96—33 |
| 3,220,832 | 11/1965 | Uhlig. | |
| 3,235,382 | 2/1966 | Neugebauer et al. | 96—33 |
| 3,375,113 | 3/1968 | Doggett. | |
| 3,061,429 | 10/1962 | Neugebauer et al. | 96—33 |
| 3,301,674 | 1/1967 | Uhlig | 96—33 XR |
| 3,404,003 | 10/1968 | Steppan | 96—33 |

NORMAN G. TORCHIN, Primary Examiner

C. BOWERS, Assistant Examiner

U.S. Cl. X.R.

96—33, 91